United States Patent [19]

Ursrey et al.

[11] 4,227,331
[45] Oct. 14, 1980

[54] FISH LURE

[75] Inventors: Curtis W. Ursrey; Richard L. Tillery, both of Hemphill, Tex.

[73] Assignee: Lite-Bait, Inc., Hemphill, Tex.

[21] Appl. No.: 884,359

[22] Filed: Mar. 7, 1978

Related U.S. Application Data

[63] Continuation-in-part of Ser. No. 774,853, Mar. 7, 1977.

[51] Int. Cl.³ .............................................. A01K 85/01
[52] U.S. Cl. .................................................... 43/17.6
[58] Field of Search ................. 43/17.5, 17.6; 307/118

[56] References Cited

U.S. PATENT DOCUMENTS

| 1,982,609 | 11/1934 | Freese | 43/17.6 |
| 3,721,033 | 3/1973 | Haynes | 43/17.6 |
| 3,940,868 | 3/1976 | Northcutt | 43/17.6 |
| 4,085,538 | 4/1978 | Jankowski | 43/17.6 |
| 4,114,305 | 9/1978 | Wohlert | 43/17.6 |

Primary Examiner—Nicholas P. Godici
Attorney, Agent, or Firm—Browning, Bushman & Zamecki

[57] ABSTRACT

A fishing lure which uses one or more light emitting diodes, preferably of a type which emit green light, the light emitting diodes being attached to and protruding outwardly from the lure body so as to provide wide angle dispersion of light, the lure further including a suitable power source disposed internally of the lure body for energizing the light emitting diode.

4 Claims, 5 Drawing Figures

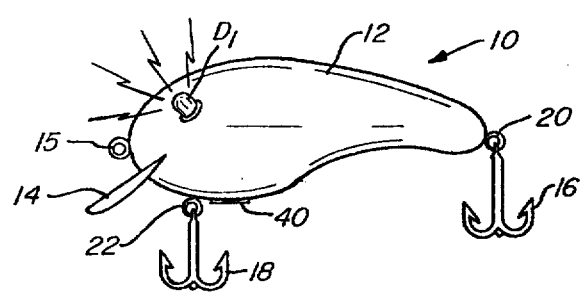
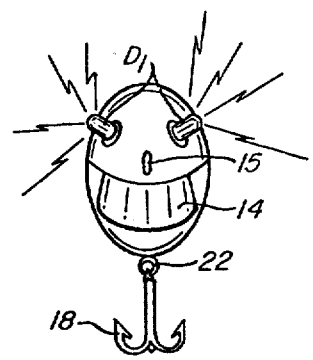
FIG. 1  FIG. 2
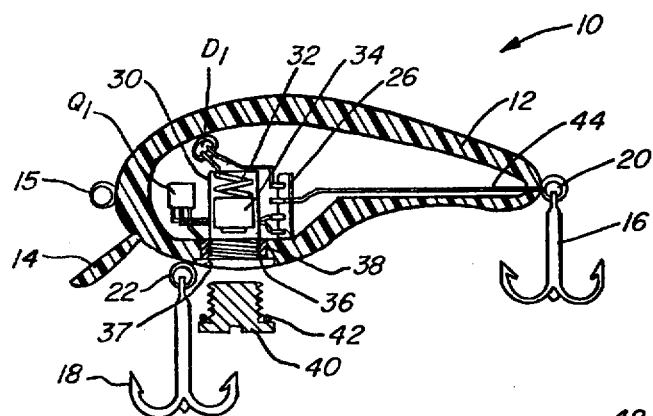
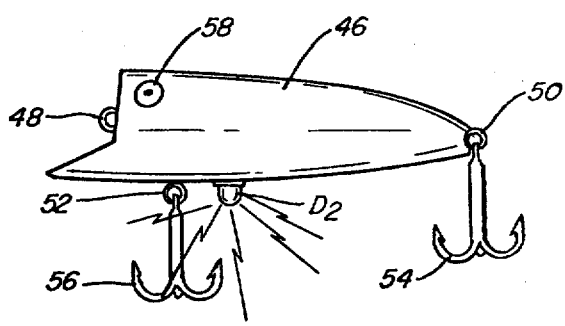
FIG. 3  FIG. 4
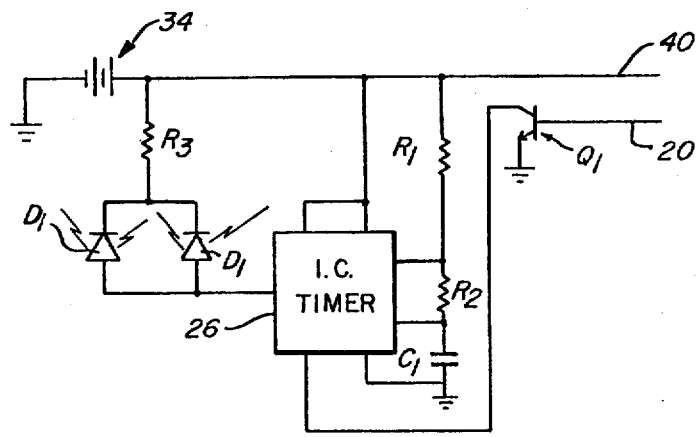
FIG. 5

FISH LURE

CROSS-REFERENCE TO RELATED APPLICATION

This is a continuation-in-part application of our co-pending application, Ser. No. 774,853, filed Mar. 7, 1977.

BACKGROUND OF THE INVENTION

The present invention relates to fishing lures, and more particularly, to fishing lures which employ light emitting diodes as light sources to increase the effectiveness of the lures.

It is known that various types of fish are attracted, to a greater or lesser extent, to various stimuli such as movement, light, sound, etc. In particular, lighted or illuminated fishing lures have been the subject of many prior art patents typical of which are U.S. Pat. Nos. 757,077, 1,079,891 and 3,040,462. The above patents are exemplary of fishing lures which have utilized incandescent light sources in attempts to make the lures more attractive to fish. The use of such incandescent light sources is bulky, making the lure oversized and in many cases too heavy. Moreover, because of the intrinsic fragile nature of incandescent light sources, the light sources are easily broken. To overcome this problem it is necessary to protect the lure by locating it internally of the lure such as encasing it in a transparent or translucent lure body or plug. This necessity for protecting the fragile incandescent light source coupled with its inherently bulky nature makes it difficult to use such light sources to make lures which have the desired attractiveness. For example, it is virtually impossible, using incandescent light sources, to make lures having "bug-like" eyes.

U.S. Pat. No. 3,950,868 to Northcutt discloses a fishing lure which utilizes light emitting diodes (commonly referred to as LED's) as the light source. While the fish lure of the Northcutt patent overcomes many of the disadvantages of the prior art discussed above with regard to incandescent light sources, it is limited in its teachings to the disposition of the LED's internally of the fish lures. This internal location of the LED's greatly minimizes the viewing angle at which the LED can be observed. Thus, it is necessary, as taught in the Northcutt patent, to encase the LED in a translucent body or to utilize fiber optics in conjunction with the LED to effect greater dispersion of the light from the LED.

SUMMARY OF THE INVENTION

It is therefore an object of the present invention to provide an improved fishing lure.

A further object of the present invention is to provide an improved illuminated fishing lure employing an LED light source.

An important object of the present invention is to provide a fishing lure employing an LED light source in such a manner as to achieve substantially maximum light emitting effect directly from the LED.

The above and other objects of the present invention will become apparent from the drawing, the description given herein and the appended claims.

The lure of the present invention includes a lure body, e.g. a plug, which may take any suitable shape and at least one LED attached to and protruding externally from the lure body so as to provide a large viewing angle of the LED. A suitable power source is disposed internally of the body to energize the LED. In the preferred case, there are a plurality, as for example two LED's, the two LED's providing "big-like" eyes on the lure. The lure of the present invention can include suitable circuitry to provide intermittant energization of the LED's and, in the preferred case, is provided with an electronic water sensor which acts as a switching mechanism to automatically energize the LED when the lure contacts water and to automatically de-energize the LED when the lure is removed from water. It has also been found that the use of LED's which emit green light provides an extremely effective lure in terms of attracting fish.

BRIEF DESCRIPTION OF THE DRAWINGS

FIG. 1 is a side, elevational view of one embodiment of the lure of the present invention.

FIG. 2 is a front, elevational view of the lure of FIG. 1.

FIG. 3 is a slightly enlarged, cross-sectional, elevational view of the lure of FIG. 1 showing schematically the power supply and related components disposed internally of the lure body.

FIG. 4 is a side, elevational view showing another embodiment of the lure of the present invention.

FIG. 5 is a schematic circuit diagram showing the power supply, electronic water sensor used for switching and the flasher used to intermittently energize the LED's.

DESCRIPTION OF THE PREFERRED EMBODIMENT

Referring to the figures, and in particular FIGS. 1-2, the fishing lure, shown generally as 10, is comprised of a body 12 generally made of a plastic or similar lightweight material. Secured to body 12 is a fin or bib 14 which aids in imparting erratic motion to lure 10 as it is pulled through the water. Body 12 is further provided with an eyelet 14 which can be attached to the fishing line in a well known fashion such that the lure 10 can be cast and retrieved by means of a conventional rod and reel. Lure 10 is further provided with hooks 16 and 18 secured to body 12 by means of hook eyelets 20 and 22, respectively. Protruding outwardly from body 12 of lure 10 are a pair of LED light sources $D_1$, light sources $D_1$ providing "bug-like" eyes on lure 10.

FIG. 3 shows generally the disposition of various components houses inside of body 12 of lure 10. It will be understood that FIG. 3 is used by way of illustration only and is not intended to accurately depict electrical connectiions of the various components that go to make up the power supply or the flasher used to energize the LED light sources $D_1$. Referring then to FIG. 3 it can be seen that an integrated circuit (IC) chip 26 is disposed in a hollow cavity 13 formd internally of body 12. IC chip 26 is of the type commonly used in flasher, oscillator, trigger or alarm circuits and, in the present instance, in conjunction with suitable RC circuitry, provides intermittent energization of light sources $D_1$. Also disposed in lure body 12 is an NPN transistor $Q_1$ which, as explained more fully below, serves as part of an electronic water sensor. A conductive battery case 30 for receiving a battery or batteries 34 is also disposed internally of body 12, coil spring 32 ensuring electrical contact between battery 34 and battery case 30. An aperture 36, counterbored as at 37, extends through the wall of body 12 whereby batteries 34 may be inserted and replaced as necessary in battery case 30. Aperture 36 is provided with a threaded conductive sleeve 38. A conductive threaded cap 40 adapted to screw into threaded sleeve 38 is provided with an O-ring 42. It will be readily observed that when plug 40 is screwed into threaded sleeve 38, a water-tight seal will be effected between plug 40 and body 12, sealing being provided by O-ring 42. Additionally, battery or batteries 34 will be firmly held in battery case 30 by the biasing action of spring 32 acting against plug 40.

As noted, transistor $Q_1$ forms the neucleus of an electronic water sensor whose purpose is to energize light sources $D_1$ when lure 10 is in contact with water and de-energize light sources $D_1$ when lure 10 is not in contact with water. One of the sensing elements or probes employed in the electronic water sensor in the embodiment shown in FIG. 3 is provided by conductive eyelet 20 which is connected to the base lead of transistor $Q_1$ by connecting wire 44. The other sensing element used in activating the system is conductive plug 40 which, via conductive sleeve 38, is in contact with the positive side of the battery or batteries 34.

To more fully illustrate the operation of one embodiment of the lure of the present invention, reference is made to FIG. 5. IC chip 26 is a common timer IC typically containing two voltage comparators, a flip-flop and an output stage. Depending upon the valves of $R_1$, $R_2$ and $C_1$, a wide variation in the time duration of the output signal from IC chip 26 can be obtained. In the embodiment shown in FIG. 5, LED light sources $D_1$ are connected so as to simultaneously blink, the blinking frequency being determined by the value of the components $R_1$, $R_2$ and $C_1$. It will be appreciated that the circuit can be easily modified to permit alternate blinking of light sources $D_1$ and, indeed, virtually any combination in terms of frequency and sequence of blinking can be achieved by selection of various IC chips and the attendant resistors and capacitors used in the circuit. It will also be recognized that if continuous energization of light sources $D_1$ is desired, the timing or flashing circuitry provided for by IC chip 26 and the attendant RC circuit can be simply dispensed with and light sources $D_1$ energized in the well known manner.

The electronic water sensor used in the lure of the present invention provides a unique and trouble-free way to energize light sources $D_1$ used in the lure when the lure is in the water, but yet will keep the light sources de-energized when the lure is not being used. The automatic nature of the electronic water sensor obviates the problems of accidently leaving a switch on thereby shortening battery life and the life of the other components in the circuit as well. Transistor $Q_1$ is a single NPN transistor connected as a current amplifier. When the base lead to transistor $Q_1$ is disconnected, there is negligble current flow from the collector to the emitter. If, however, the base lead is connected to the positive power supply through a suitable resistance, the transistor is biased into conduction and current flows through the collector-emitter junction. In the embodiment shown, the base lead of the transistor 28 is connected to eyelet 20 which when the lure is in use is in contact with the water. Thus, eyelet 20, in the embodiment shown, constitutes one probe or sensing element of the electronic water sensor. The other probe or sensing element, as noted above, comprises threaded plug 40. It will be seen that when the lure is in use, i.e. in the water, the base of transistor $Q_1$ via eyelet 20 and/or hook 16 will be connected to the positive power supply of battery 34 via threaded plug 40 and sleeve 38, the water serving as the "suitable" resistance between the base and the positive power supply. Thus, when lure 10 is cast into the water, transistor $Q_1$ will conduct in the manner described above and will act as an automatic switch to energize light sources $D_1$. As soon as lure 10 is removed from the water, the necessary resistance between plug 40 and eyelet 20 will be removed and light sources $D_1$ will be de-energized. In addition to the advantages set forth above in using the electronic water sensor, it should be observed that, if properly selected, transistor $Q_1$ will not conduct if a very low resistance connection occurs between threaded plug 40 and eyelet 20 and/or hook 16. For this reason, light sources $D_1$ will not be energized when lure 10 is left in a tackle box and may accidently come into contact with hooks and other highly conductive, low resistance, metallic objects which would connect eyelet 20 and plug 40. Thus, battery life will be maintained since energization will occur only when the lure is in contact with water, i.e. a suitable resistance.

Representative values of the circuit elements, together with circuit details are given in Table I below.

TABLE I $R_1$—2.2K
$R_2$—10 MEG
$R_3$—150 ohms
$C_1$—1.0 mfd.
$D_1$—LED
$Q_1$—2N2222
IC Timer 26—NE 555

Referring now to FIG. 4, there is shown a variation of the lure of the present invention wherein the lure is equipped with a single LED as a light source. It will be understood that, except for the presence of only one LED light source and a different physical shape, the lure shown in FIG. 4 is substantially the same as that shown in FIGS. 1-3. The lure of FIG. 4 comprises a body 46 having an eyelet 48 for attachment to a fishing line or the like. Body 46 is further provided with hook eyelets 50 and 52 to which are attached hooks 54 and 56, respectively. To enhance attractiveness, a simulated eye 58 is painted, embossed or otherwise provided on body 46. As explained, the lure shown in FIG. 4 is provided with a single LED light source $D_2$ which can be the same or different as the LED light sources $D_1$ used in the embodiments of in FIGS. 1-3 and 5, and which can be made as a constantly energized light source or, as in the case described in FIG. 5, an intermittently energized light source.

It will be understood that LED light sources emitting light of any wave length can be employed in the lure of the present invention, the requisite being that the LED light sources are secured to the lure body in a direct, rigid fashion so as to protrude externally, outwardly from the lure body to provide wide angle dispersion of the light emanating from the LED light source(s). Although, as noted, LED's which emit light of any wave length can be employed, it has been observed that the use of LED's which emit green light make the lure particularly attractive to fish. While the reason for this phenomenon is not fully understood, it is believed that the fish's optical sensory mechanism is more sensitive to green light than other colors of light. There may be the additional factor that bodies of water in which fish are normally found do not act to filter out green light as much as perhaps other colors of light. Thus, for example, the red light from an LED emitting such, perhaps being filtered out by the water, would not be as readily observed by the fish.

It has been found that LED's in which the green light emitted has a peak emission wave length of between about 550 to about 575 nm are particularly effective. The peak emission wave length, as used herein, is the wave length at which the emitting light has the greatest luminous intensity (candlepower) where luminous intensity, I, is defined as follows:

$$I = dF/d\omega$$

where F is luminous flux in lumens (lm) and $\omega$ is a solid angle through which flux from point source is radiated. It will be apparent that luminous intensity (I) has units of candela (lumens/ steradian). Typical of an LED having the desirable optical characteristics is an LED manufactured by the Monsanto Company and designated as Model No. MV52. The Model MV52 has a peak emission wave length typically about 565 nm.

The precise manner in which the LED light sources are attached to the lure body can vary widely. Thus, for example, the LED light sources can be disposed through suitable openings in the wall of the lure body, a portion of the LED light source containing the leads remaining internally of the lure body. Alternately, the LED light source can be secured to the lure body such that it is completely external of the lure body, only the leads extending through a suitable opening in the lure body to be connected to the power supply internally of the body. In both cases, epoxy or the like can be conveniently utilized to secure the LED light sources to the lure body and at the same time provide water tight sealing to prevent water from entering the interior hollow of the lure body, thus interfering with the operation of or damaging the power supply. Disposition of the LED light source in the manner described, i.e. such that it extends externally, outwardly of the lure body greatly enhances the attractiveness of the lure since it provides a much greater viewing angle of the light from the LED. Thus, whereas in prior art fishing lures such as the type disclosed in the Northcutt patent, direct viewing of the light from the LED light source is restricted to a relatively small viewing angle, the present invention provides a fishing lure wherein maximum or near maximum effectiveness of light from the LED light source can be obtained.

It will be appreciated by those skilled in the art that various changes and modifications may be made to the fishing lure such as that described without departing from the inventive concepts disclosed herein. It is the aim of the appended claims to cover all such variations and modifications as fall within the true scope of the invention.

We claim:

1. A fishing lure comprising:
   a lure body,
   at least one light emitting diode light source rigidly secured to and protruding outwardly from said body, said light emitting diode being of a type which emits a green light having a peak emission wave length between about 550 to about 575 nm,
   power supply means disposed internally of said body for energizing said light source,
   hook means secured to said body, and
   a solid state, electronic water sensor means including a transistor and connected to said power supply and said light source, said water sensor means serving to automatically energize said light source when said lure is in contact with water, said water sensor means comprising at least two sensing elements for contacting with said water, said water sensor being of a type in which the water acts as a resistance effective to bias said transistor into conducting.

2. The lure of claim 1 wherein there are a plurality of said light sources.

3. The lure of claim 1 including means electrically connected to said power supply and said light source for intermittingly energizing said light source.

4. The lure of claim 3 wherein there are a plurality of said light sources.

* * * * *